US008848782B2

(12) United States Patent  (10) Patent No.: US 8,848,782 B2
Ogata                                                     (45) Date of Patent:     Sep. 30, 2014

(54) RECEPTION APPARATUS, RECEPTION METHOD, AND PROGRAM WITH ENCODING BIT RATE DETERMINATION

(75) Inventor: Ichiro Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 952 days.

(21) Appl. No.: 12/974,728

(22) Filed: Dec. 21, 2010

(65) Prior Publication Data

US 2011/0158313 A1    Jun. 30, 2011

(30) Foreign Application Priority Data

Dec. 28, 2009  (JP) ................. 2009-296763

(51) Int. Cl.
| | |
|---|---|
| H04N 7/26 | (2006.01) |
| H04N 21/4788 | (2011.01) |
| H04N 21/845 | (2011.01) |
| H04N 19/156 | (2014.01) |
| H04N 19/115 | (2014.01) |
| H04N 21/2365 | (2011.01) |
| H04N 7/18 | (2006.01) |
| H04N 21/6373 | (2011.01) |
| H04N 21/2343 | (2011.01) |
| H04N 21/442 | (2011.01) |
| H04N 21/24 | (2011.01) |
| H04N 21/6379 | (2011.01) |

(52) U.S. Cl.
CPC ........... *H04N 7/181* (2013.01); *H04N 21/4788* (2013.01); *H04N 21/8456* (2013.01); *H04N 19/00206* (2013.01); *H04N 21/6373* (2013.01); *H04N 19/0006* (2013.01); *H04N 21/2343* (2013.01); *H04N 21/44209* (2013.01); *H04N 21/23655* (2013.01); *H04N 21/2402* (2013.01); *H04N 21/6379* (2013.01)
USPC .................................................. 375/240.02

(58) Field of Classification Search
CPC ................................................. H04L 29/06027
USPC ..................................... 375/240.02; 348/14.08
See application file for complete search history.

(56) References Cited

U.S. PATENT DOCUMENTS

| | | | |
|---|---|---|---|
| 2002/0024952 A1* | 2/2002 | Negishi et al. | 370/394 |
| 2007/0211141 A1* | 9/2007 | Christiansen | 348/14.08 |
| 2008/0068446 A1* | 3/2008 | Barkley et al. | 348/14.07 |
| 2008/0143877 A1* | 6/2008 | Urabe et al. | 348/556 |

FOREIGN PATENT DOCUMENTS

| | | |
|---|---|---|
| JP | 6-149523 | 5/1994 |
| JP | 2001-356753 | 12/2001 |

* cited by examiner

*Primary Examiner* — Jay Patel
*Assistant Examiner* — Yulin Sun
(74) *Attorney, Agent, or Firm* — Oblon, Spivak, McClelland, Maier & Neustadt, L.L.P.

(57) ABSTRACT

A reception apparatus includes: a data reception unit receiving compressed/encoded data from external apparatuses; a decoding unit decoding the compressed/encoded data to obtain received data; a data processing unit performing data processing so that information based on the received data obtained from the decoding unit is displayed on corresponding display windows, respectively; a window size setting unit setting sizes of the display windows respectively corresponding to the external apparatuses; an encoding bit rate determination unit determining an encoding bit rate of each external apparatus corresponding to the size of the display window based on a correspondence relation between the size of the display window and the encoding bit rate; an information transmission unit transmitting information regarding each of the encoding bit rates to each of the corresponding external apparatuses; and a size/bit rate correspondence relation setting unit setting the correspondence relation for each of the external apparatuses.

12 Claims, 13 Drawing Sheets

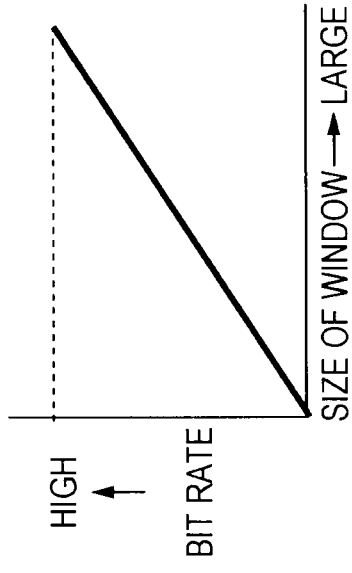
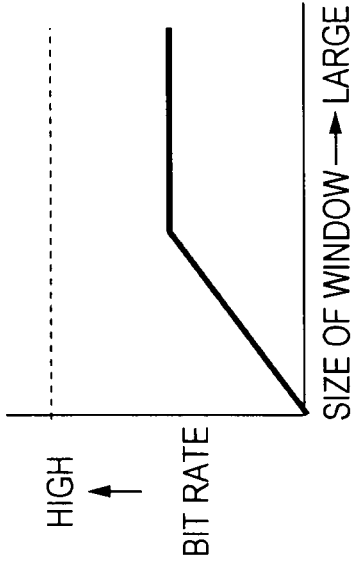
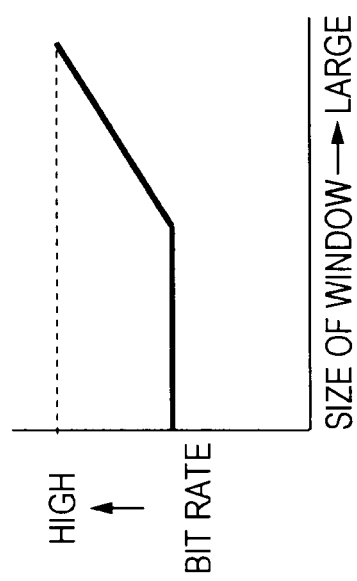

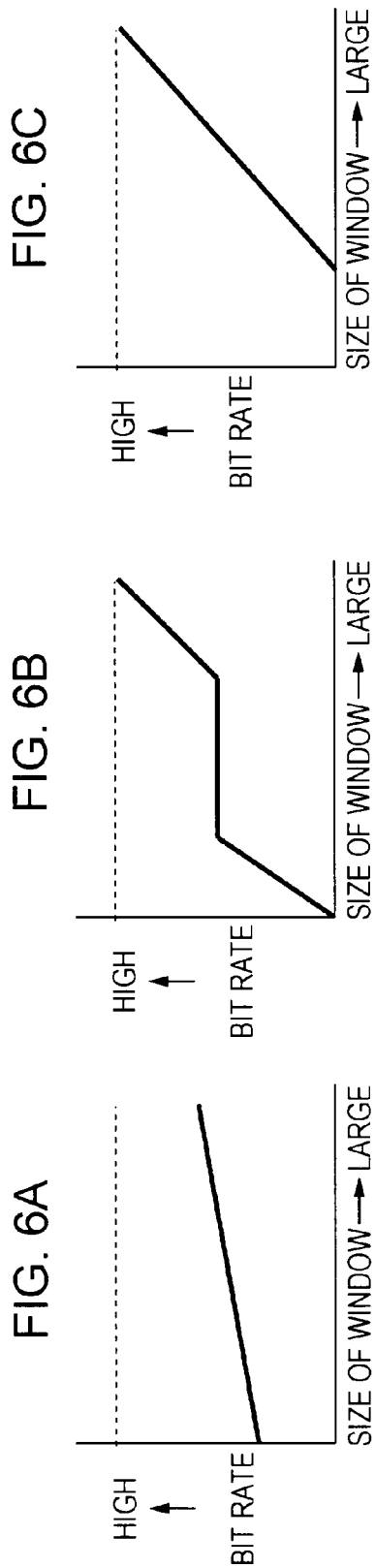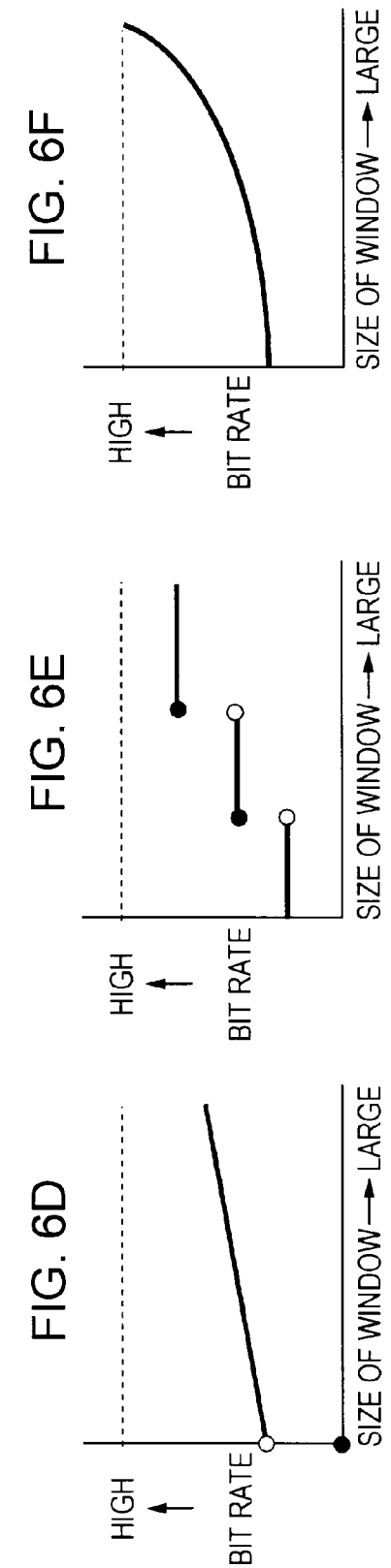

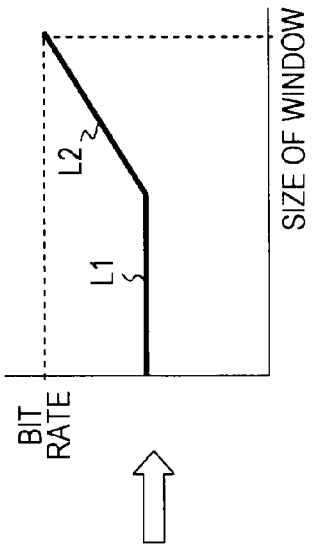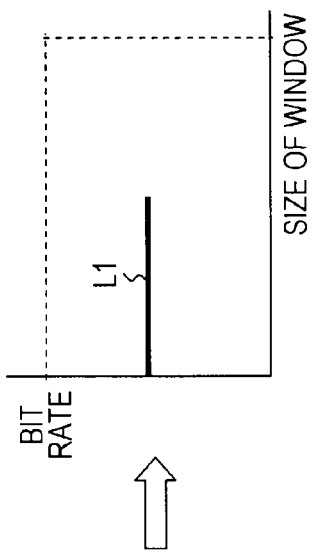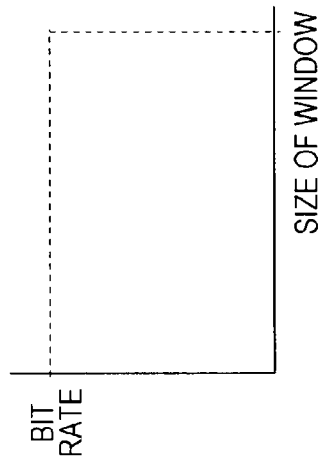

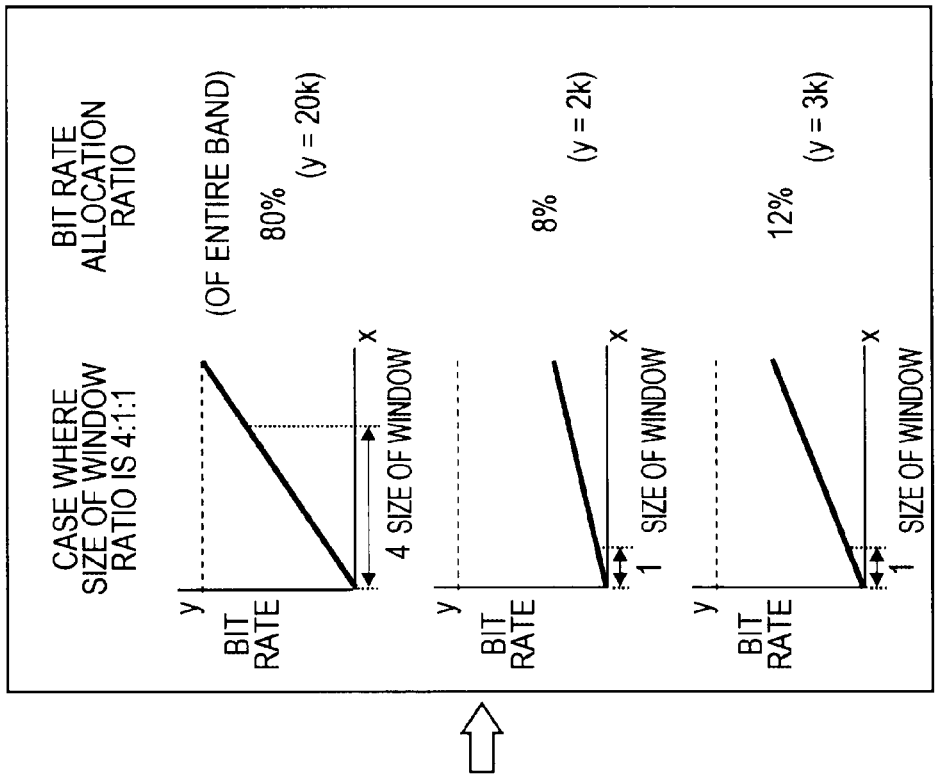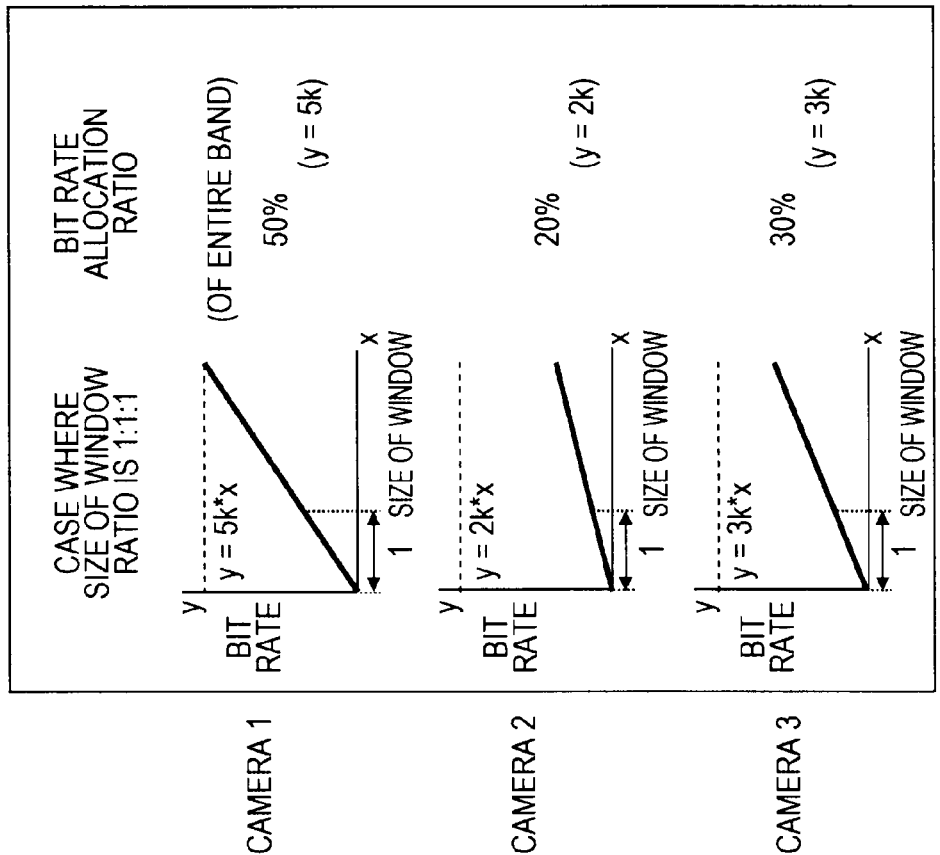

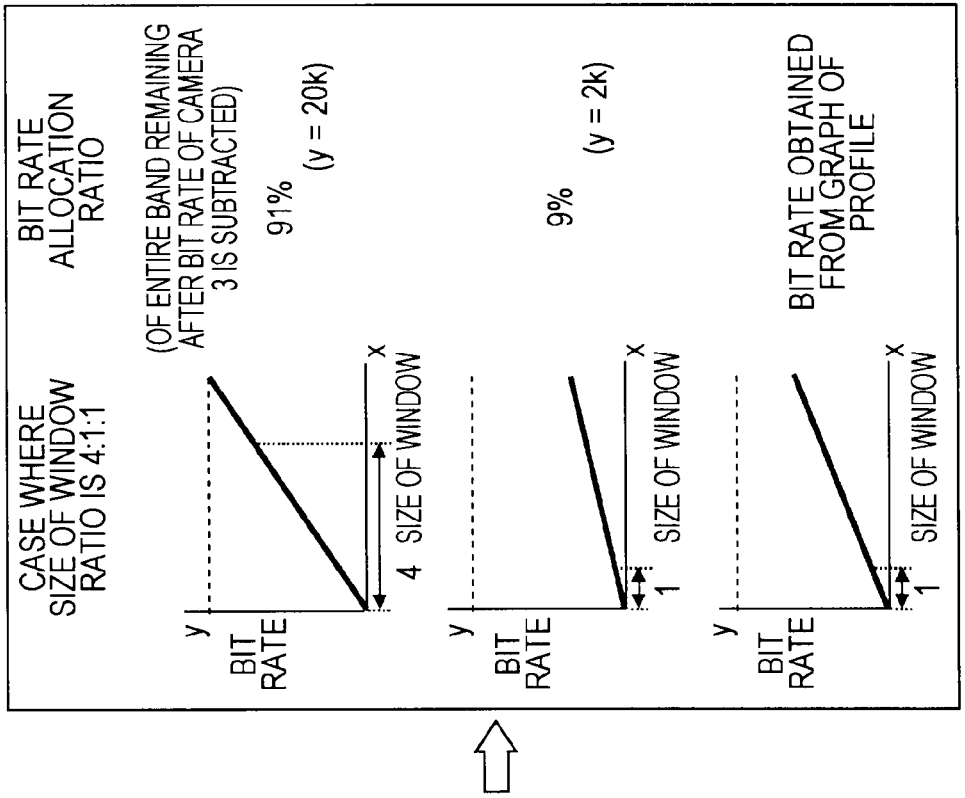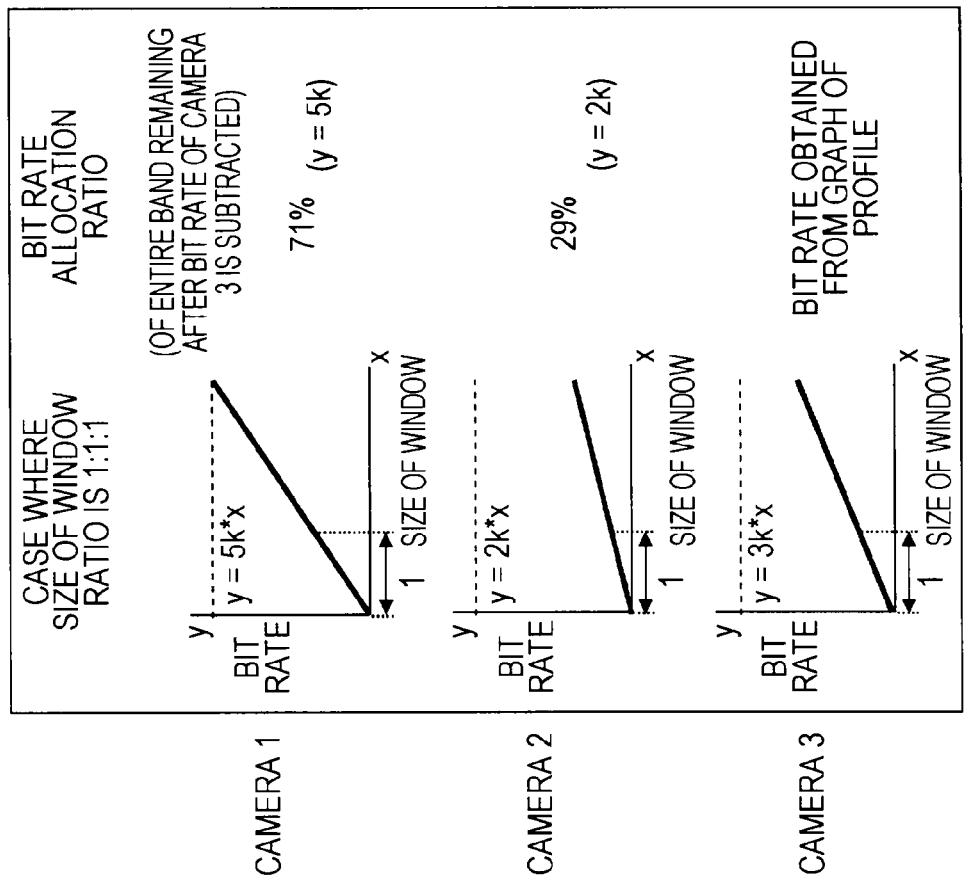

RECEPTION APPARATUS, RECEPTION METHOD, AND PROGRAM WITH ENCODING BIT RATE DETERMINATION

BACKGROUND OF THE INVENTION

1. Field of the Invention

The present invention relates to a reception apparatus, a reception method, and a program, and more particularly, to a reception apparatus capable of setting the sizes of display windows on a screen which displays each set of information from a predetermined number of external apparatuses.

2. Description of the Related Art

In a monitoring camera system, analog cameras according to the related art have been substituted by digital networked cameras. Moreover, at the present time, the low cost and convenience of the networked cameras have led to market acceptance. Therefore, the monitoring camera system has been used for the following usages, for example, as well as security monitoring.

Sales Room Monitoring, Understanding Situation In and Out Store
Monitoring Inside Situation
Supporting Treatment and Nursing Care
Recording Clinical Practice
Supplying Live Video
Monitoring and Recording Experiments As the monitoring camera system is widely used, a method of using images captured by a camera becomes diverse. In particular, in regard to the function and performance of monitoring images in real time, demand has arisen for usability which has hitherto been absent.

In the analog camera era, images obtained from image data from a predetermined number of monitoring cameras were mainly displayed on a monitoring screen in a fixed tile-like form, and the image data were mainly recorded by a recording apparatus to be stored for a given period. This type of system was substituted by an initial system configured by networked cameras.

Thereafter, the values of encoding bit rate of an image compression encoder incorporated in the network camera can be set for each camera. By setting the encoding bit rate, the qualities of the images of the networked cameras can be individually adjusted according to a monitoring target or a monitoring goal.

A protocol capable of changing the quality of the image from a specific camera currently performing monitoring in real time was also formulated, and thus an environment where an integrated system can be constructed at low use cost according to a monitoring goal has been formed. This protocol is a security camera control protocol formulated by ONVIF (Open Network Video Interface Forum) which is an interface specification standardization forum of a network camera product.

For example, as disclosed in Japanese Unexamined Patent Application Publication No. 6-149523, a system capable of setting the resolution in a security camera in each image display frame (window) of a monitoring apparatus is realized as an example of the monitoring apparatus. For example, as disclosed in Japanese Unexamined Patent Application Publication No. 2001-356753, a system capable of combining the resolution, the bit rate, and the like in a security camera with the size or the like of each image display frame (window) in a monitoring apparatus is realized as an example of the monitoring apparatus.

SUMMARY OF THE INVENTION

When the quality of an image captured by each network camera is adjusted by setting the encoding bit rate, the sum of the amounts of data transmitted from the cameras may exceed the bandwidth of a network infrastructure connecting the cameras to the monitoring apparatus. In this case, since omission or the like of a frame of an image may be caused, a mechanism of preventing this omission is necessary. That is, when the encoding bit rate of a camera is changed, a mechanism of automatically adjusting the values of the encoding bit rates of the other cameras can be taken into consideration.

As a simple adjustment method, a method of equally dividing the remaining bit rate for the other cameras or proportionally dividing the remaining bit rate based on the set bit rate may be taken into consideration. However, this method has the following problems.

(1) When it is intended to maintain the quality of an image in a specific camera normally at a level equal to or higher than a given level, the quality of the image in the specific camera may not be maintained at the level equal to or higher than the given quality level under the influence of adjustment of the quality of an image in another camera.

(2) When an image from a specific camera is not relatively important and the quality of the image is thus allowed to be maintained normally at a level equal to or lower than a given level, the quality of the image in the specific camera may be unnecessarily set to be at a high level under the influence of adjustment of the quality of the image in another camera.

(3) When a problem occurs in the currently used network line and the network line is thus switched to a backup line with a narrower bandwidth, it is necessary to adjust and reduce the sum value of the amounts of data transmitted from the respective cameras to the bandwidth of the backup line. Even in this case, a method capable of solving the problems (1) and (2) and adjusting the quality of a realistic image is preferable.

It is desirable to provide a reception apparatus capable of setting the encoding bit rates of respective external apparatuses satisfactorily.

According to an embodiment of the invention, there is provided a reception apparatus including: a data reception unit receiving compressed/encoded data from a predetermined number of external apparatuses connected via a network; a decoding unit decoding the compressed/encoded data received by the data reception unit to obtain received data; a data processing unit performing data processing so that information based on the received data, which have been transmitted from the predetermined number of external apparatuses, obtained from the decoding unit is displayed on corresponding display windows on a screen, respectively; a window size setting unit setting sizes of the display windows respectively corresponding to the predetermined number of external apparatuses; an encoding bit rate determination unit determining an encoding bit rate of each external apparatus corresponding to the size of the display window set by the window size setting unit based on a correspondence relation between the size of the display window and the encoding bit rate; an information transmission unit transmitting information regarding each of the encoding bit rates determined by the encoding bit rate determination unit to each of the corresponding external apparatuses; and a size/bit rate correspondence relation setting unit setting the correspondence relation between the size of the display window and the encoding bit rate for each of the predetermined number of external apparatuses.

According to the embodiment of the invention, the data reception unit receives the compressed/encoded data from the predetermined number of external apparatuses connected via the network. For example, the compressed/encoded data includes compressed-image data, compressed-document data, and compressed-voice data. The external apparatus is an apparatus which transmits the above-described compressed/encoded data. Examples of the external apparatus include a monitoring camera, a VOD (Video On Demand) sever, and a terminal of a TV conference apparatus.

The decoding unit performs the decoding process on the compressed/encoded data received by the data reception unit to obtain the reception data. The data processing unit performs the data processing so that the information (an image, a figure, text, or the like) based on the received data, which have been transmitted from the predetermined number of external apparatuses, obtained from the decoding unit is displayed on the corresponding display windows on the screen, respectively.

The window size setting unit sets the sizes of the display windows respectively corresponding to the predetermined number of external apparatuses. The sizes of the display windows are set, for example, when a user drags the display windows using a mouse or a user uses a slider or a spin button displayed on a UI (User Interface) screen.

The encoding bit rate determination unit determines the encoding bit rate of each external apparatus corresponding to the size of the display window set by the window size setting unit. In this case, the encoding bit rate of each external apparatus is determined based on the correspondence relation (profile) between the size of the display window and the encoding bit rate. Then, the information transmission unit transmits the information regarding each of the encoding bit rates determined by the encoding bit rate determination unit to each of the corresponding external apparatuses. Each of the external apparatuses generates the compressed/encoded data based on the transmitted information of the encoding bit rate.

The size/bit rate correspondence relation setting unit sets the correspondence relation between the size of the display window and the encoding bit rate for each of the predetermined number of external apparatuses. In this case, for example, the size/bit rate correspondence relation setting unit suggests a setting user interface screen. In this case, the user can easily set the correspondence relation between the size of the display window and the encoding bit rate using the setting user interface screen.

The encoding bit rate determination unit determines the encoding bit rate of each external apparatus based on the correspondence relation between the size of the display window and the encoding bit rate. In addition, the size/bit rate correspondence relation setting unit can set the correspondence relation between the size of the display window and the encoding bit rate for each of the external apparatuses.

For example, when an image from a target external apparatus is not important, the size of the display window is set to a value equal to or larger than a given value and the encoding bit rate is set to be the given upper limit value as the correspondence relation between the size of the display window and the encoding bit rate for this external apparatus. For example, when an image from a target external apparatus is important, the size of the display window is set to a value equal to or smaller than a given value and the encoding bit rate is set to be the given lower limit value as the correspondence relation between the size of the display window and the encoding bit rate. Therefore, the encoding bit rate of each external apparatus can be set to the value corresponding to an importance or a role (goal).

According to the embodiment of the invention, for example, the encoding bit rate determination unit may calculate the encoding bit rate of each external apparatus corresponding to the size of the display window set by the window size setting unit based on the correspondence relation between the size of the display window and the encoding bit rate, may calculate a bit rate allocation ratio of the respective external apparatuses based on the calculated encoding bit rates of the external apparatuses, and may determine the encoding bit rates of the external apparatuses by allocating a sum bandwidth bit rate, which is used to receive the compressed/encoded data from the predetermined number of external apparatuses, at the calculated bit rate allocation ratio of the respective calculated external apparatuses.

In this case, the encoding bit rates of the external apparatuses are determined by allocating the sum bandwidth bit rate at the bit rate allocation ratio of the respective external apparatuses. Accordingly, the sum value of the encoding bit rates of the external apparatus does not exceed the sum bandwidth bit rate. For example, a frame of an image can be prevented from being omitted. In this case, the bit rate allocation ratio of the respective external apparatuses is calculated based on the encoding bit rates corresponding to the sizes of the display windows calculated from the correspondence relation between the size of the display window and the encoding bit rate each of the external apparatuses. Therefore, the individually set correspondence relation between the size of the display window and the encoding bit rate is reflected in the encoding bit rates of the external apparatuses, and thus the encoding bit rate of each external apparatus can be set to the value corresponding to an importance or a role (goal).

According to the embodiment of the invention, for example, the reception apparatus may further include an option setting unit setting a bit rate value priority option to some or all of the predetermined number of external apparatuses. The encoding bit rate determination unit may calculate the encoding bit rate of each external apparatus corresponding to the size of the display window set by the window size setting unit based on the correspondence relation between the size of the display window and the encoding bit rate, may determine the calculated encoding bit rates of the external apparatuses as the encoding bit rates of the external apparatuses in which the bit rate value priority option is set by the option setting unit, when a sum value of the calculated encoding bit rates of the external apparatuses in which the bit rate value priority option is set by the option setting unit does not exceed a sum bandwidth bit rate which is used to receive the compressed/encoded data from the predetermined number of external apparatuses, may calculate a bit rate allocation ratio of the respective external apparatuses other than the external apparatuses in which the bit rate value priority option is set by the option setting unit among the predetermined number of external apparatuses based on the encoding bit rates of the external apparatuses, and may determine the encoding bit rates of the external apparatuses by allocating, at the calculated bit ratio allocation ratio of the respective external apparatuses, a remaining bit rate obtained by subtracting a sum value of the calculated encoding bit rates of the external apparatuses, in which the bit rate value priority option is set by the option setting unit, from the sum bandwidth bit rate.

In this case, the calculated encoding bit rates of the external apparatuses in which the bit rate value priority option is set by the option setting unit are determined as the encoding bit rates of the external apparatuses. The encoding bit rates of the other external apparatuses are determined by allocating, at the bit rate allocation ratio calculated based on the calculated encoding bit rates of the external apparatuses, the remaining bit rate obtained by subtracting the sum value of the encoding bit rates of the external apparatuses, in which the bit rate value priority option is set, from the sum bandwidth bit rate.

Accordingly, the sum value of the encoding bit rates of the external apparatus does not exceed the sum bandwidth bit rate. For example, a frame of an image can be prevented from being omitted. In this case, the change in the sizes of the display windows of the other external apparatuses does not influence on the encoding bit rates of the external apparatuses in which the bit rate value priority option is set. The individually set correspondence relation between the size of the display window and the encoding bit rate is reflected in the encoding bit rates of the external apparatuses other than the external apparatuses in which the bit rate value priority option is set, and thus the encoding bit rate of each external apparatus can be set to the value corresponding to an importance or a role (goal).

According to the embodiment of the invention, for example, the encoding bit rate determination unit may calculate a bit rate allocation ratio of the predetermined number of all external apparatuses based on the calculated encoding bit rate of each external apparatus, when the sum value of the calculated encoding bit rates of the external apparatuses in which the bit rate value priority option is set by the option setting unit exceeds the sum bandwidth bit rate, and may determine the encoding bit rate of each external apparatus by allocating the sum bandwidth bit rate at the calculated bit rate allocation ratio of the respective calculated external apparatuses.

In this case, the encoding bit rates of the external apparatuses are determined by allocating the sum bandwidth bit rate at the bit rate allocation ratio of the respective external apparatuses. Accordingly, the sum value of the encoding bit rates of the external apparatuses does not exceed the sum bandwidth bit rate. For example, a frame of an image can be prevented from being omitted. In this case, the bit rate allocation ratio of the respective external apparatuses is calculated based on the encoding bit rates corresponding to the sizes of the display windows calculated from the correspondence relation between the size of the display window and the encoding bit rate for each of the external apparatuses. Therefore, the correspondence relation between the size of the display window and the encoding bit rate is reflected in the encoding bit rates of the external apparatuses, and thus the encoding bit rate of each external apparatus can be set to the value corresponding to an importance or a role (goal).

According to the embodiment of the invention, for example, the encoding bit rate determination unit may calculate the encoding bit rate of each external apparatus corresponding to the size of the display window set by the window size setting unit based on the correspondence relation between the size of the display window and the encoding bit rate, and may determine the calculated encoding bit rate of each external apparatus as the encoding bit rate of each external apparatus.

In this case, the bit rate allocation ratio of the respective external apparatuses is calculated based on the encoding bit rates corresponding to the sizes of the display windows calculated from the correspondence relation between the size of the display window and the encoding bit rate for each of the external apparatuses. Therefore, the individually set correspondence relation between the size of the display window and the encoding bit rate is reflected in the encoding bit rates of the external apparatuses, and thus the encoding bit rate of each external apparatus can be set to the value corresponding to an importance or a role (goal).

According to the embodiment of the invention, for example, the encoding bit rate determination unit may determine the encoding bit rate of each external apparatus, when the window size setting unit changes the size of the display window corresponding to at least one of the external apparatuses. Thus, when the size of the corresponding display window is changed in at least one of the external apparatuses, the encoding bit rate of each external apparatus can be changed immediately to an optimum value with the change.

According to the embodiment of the invention, for example, the reception apparatus may further include a sum bandwidth bit rate changing unit changing the sum bandwidth bit rate which is used to receive the compressed/encoded data from the predetermined number of external apparatuses. The encoding bit rate determination unit may determine the encoding bit rate of each external apparatus, when the sum bandwidth bit rate changing unit changes the sum bandwidth bit rate.

Accordingly, when the sum bandwidth bit rate is changed, the encoding bit rate of each external apparatus can be changed immediately to an optimum value with the change. For example, when a problem occurs in the currently used network line and thus the network line is changed to a backup line with a narrower bandwidth, the sum value of the encoding bit rates of the external apparatuses does not exceed the sum bandwidth bit rate. Therefore, a frame of an image can be prevented from being omitted. Moreover, the sum bandwidth bit rate can be changed. Therefore, when compressed/encoded data from each external apparatus is stored, a recoding bit rate can be changed with ease.

According to the embodiment of the invention, the encoding bit rates of the predetermined number of external apparatuses are determined based on the correspondence relation between the size of the display window and the encoding bit rate, and the correspondence relation between the size of the display window and the encoding bit rate can be set in each of the external apparatuses. Therefore, the encoding bit rates of the external apparatuses can be set satisfactorily.

BRIEF DESCRIPTION OF THE DRAWINGS

FIGS. 5A to 5D are diagrams illustrating examples of a correspondence relation (profile) between the size of a display window and an encoding bit rate.

FIGS. 6A to 6F are diagrams illustrating further examples of the correspondence relation (profile) between the size of the display window and the encoding bit rate.

FIGS. 7A to 7C are diagrams illustrating the order in which a user sets the profile of a given monitoring camera using a setting UI screen.

FIGS. 10A and 10B are diagrams illustrating specific cases in which the encoding bit rates of the cameras (Camera 1, Camera 2, and Camera 3 in which an option is not set) are determined.

FIGS. 11A and 11B are diagrams illustrating specific cases in which the encoding bit rates of the cameras (Camera 1 and Camera 2 in which an option is not set and Camera 3 in which an option is set) are determined.

DESCRIPTION OF THE PREFERRED EMBODIMENTS

Hereinafter, a preferred embodiment (hereinafter, referred to as an "embodiment") of the invention will be described. The description order is as follows.
1. Embodiment
2. Modified Examples

1. Embodiment

Configuration of Monitoring Camera System

Figure 1:
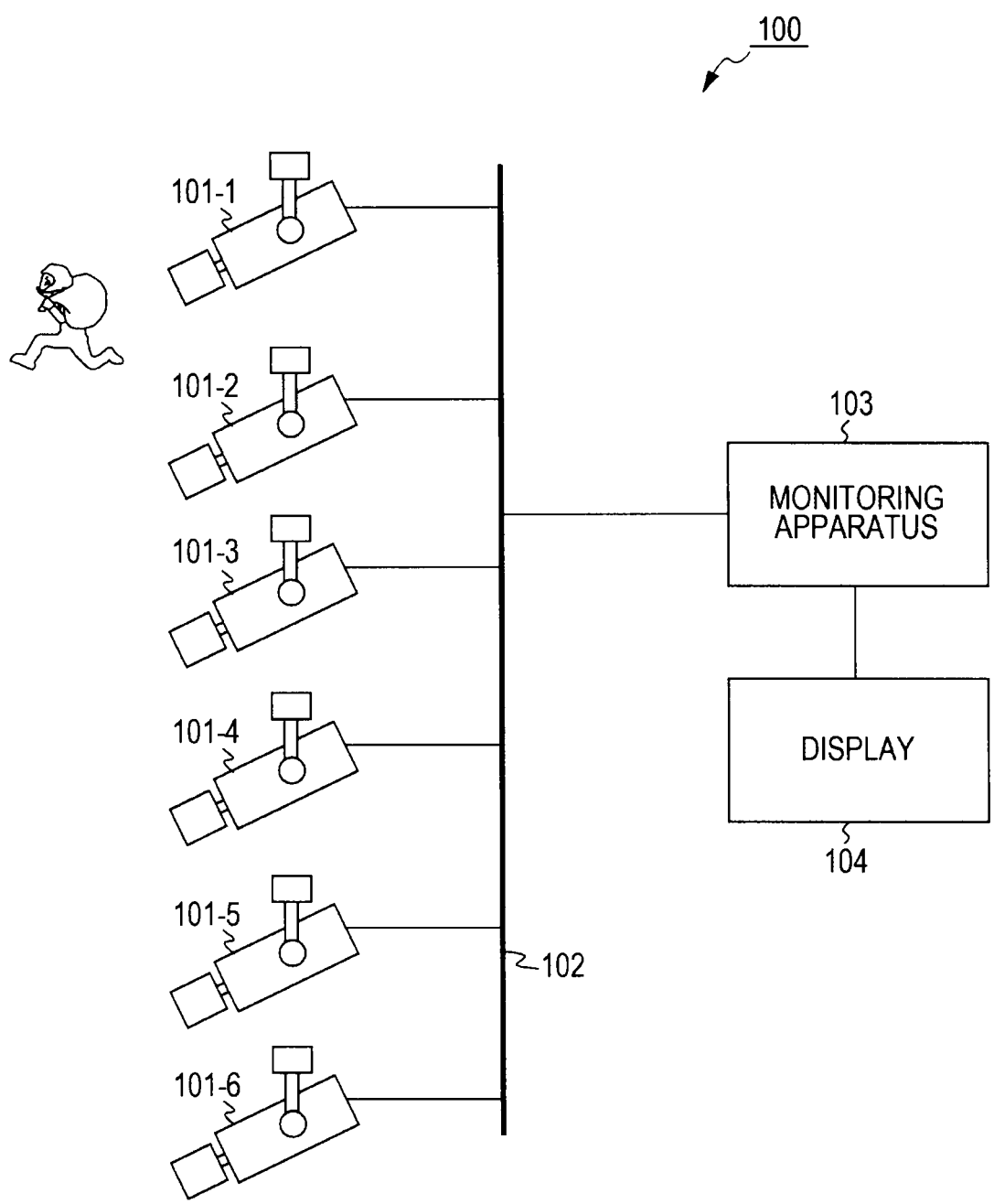
FIG. 1 is a block diagram illustrating an exemplary configuration of a monitoring camera system according to an embodiment of the invention.

FIG. 1 is a diagram illustrating an exemplary configuration of a monitoring camera system 100 according to an embodiment. In the monitoring camera system 100, six monitoring cameras (networked cameras) 101-1 to 101-6 are connected to a monitoring apparatus 103 serving as a reception apparatus via a network 102. A display 104 is connected to the monitoring apparatus 103.

The monitoring cameras 101-1 to 101-6 capture monitoring images, generate image data corresponding to the monitoring images, and transmit compressed-image data obtained by an internal image compression encoder to the monitoring apparatus 103 via the network 102. The monitoring apparatus 103 receives the compressed-image data transmitted from the monitoring cameras 101-1 to 101-6 and performs a decoding process to obtain received-image data.

The monitoring apparatus 103 performs a scaling process or the like on the received-image data to generate display image data used for displaying the images of the monitoring cameras 101-1 to 101-6 on corresponding display windows (display ranges) within respective screens, and supplies the display image data to the display 104. The display 104 displays images formed by the display image data transmitted from the monitoring apparatus 103.

The monitoring apparatus 103 determines encoding bit rates of the monitoring cameras 101-1 to 101-6 and transmits information regarding the encoding bit rates to the corresponding monitoring cameras via the network 102. The monitoring cameras 101-1 to 101-6 each control an operation of the image compression encoder based on the information regarding the encoding bit rate transmitted from the monitoring apparatus 103. That is, in each of the monitoring cameras 101-1 to 101-6, the operation of the image compression encoder is controlled such that a bit rate of the compressed-image data becomes a bit rate indicated by the information regarding the encoding bit rate transmitted from the monitoring apparatus 103.

Exemplary Configuration of Monitoring Camera

Figure 2:
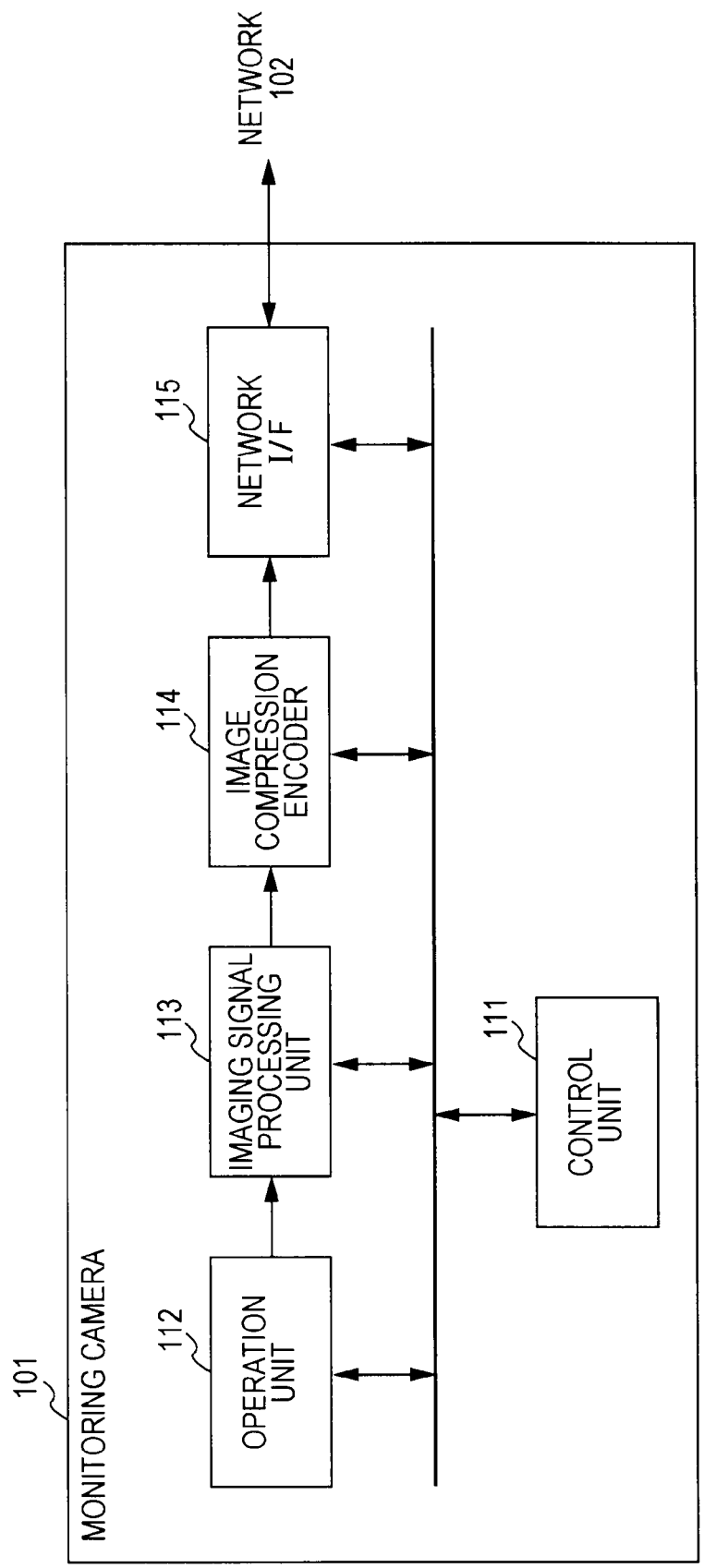
FIG. 2 is a block diagram illustrating an exemplary configuration of a monitoring camera forming the monitoring camera system.

FIG. 2 is a diagram illustrating an exemplary configuration of each of the monitoring cameras 101 (101-1 to 101-6). The monitoring camera 101 includes a control unit 111, an imaging unit 112, an imaging signal processing unit 113, an image compression encoder 114, and a network interface 115.

The control unit 111 controls an operation of each unit of the monitoring camera 101. For example, the control unit 111 includes a CPU (Central Processing Unit), a ROM (Read-Only Memory), and a RAM (Random Access Memory). The CPU controls the operation of each unit by reading a control program stored in the ROM, as necessary, transmitting and developing the read control program to and on the RAM, and reading and executing the developed control program.

The imaging unit 112, which includes an imaging lens and an imaging element (neither of which are shown), captures a monitoring image and outputs an imaging signal corresponding to the monitoring image. The imaging element is an imaging element such as a CCD (Charged Coupled Device) or a CMOS (Complementary Metal-Oxide Semiconductor). The imaging signal processing unit 113 generates the image data by performing sample-and-hold and gain control, conversion from an analog signal into a digital signal, white balance adjustment, gamma correction, and the like on the imaging signal (analog signal) output from the imaging unit 112. The image data has a given resolution.

The image compression encoder 114 performs a data compressing process on the image data generated by the imaging signal processing unit 113 in conformity with a method such as MPEG-4 AVC to generate compressed-image data. The network interface 115 transmits the compressed-image data generated by the image compression encoder 114 to the monitoring apparatus 103 via the network 102 (see FIG. 1). The network interface 115 receives the information regarding the encoding bit rate transmitted from the monitoring apparatus 103 via the network 102 and supplies the received information regarding the encoding bit rate to the control unit 111.

In FIG. 2, the operation of the monitoring camera 101 will be described. The imaging signal (analog signal) corresponding to the monitoring image from the imaging unit 112 can be obtained. The imaging signal is supplied to the imaging signal processing unit 113. The imaging signal processing unit 113 generates the image data by performing analog signal processing such as sample-and-hold and gain control and digital signal processing such as A/D conversion, white balance adjustment, and gamma correction on the imaging signal.

The image data is supplied to the image compression encoder 114. The image compression encoder 114 generates the compressed-image data by performing the data compressing process on the image data. The compressed-image data is supplied to the network interface 115 and is transmitted to the monitoring apparatus 103 via the network 102.

The network interface 115 receives the information regarding the encoding bit rate transmitted from the monitoring apparatus 103. The information regarding the encoding bit rate is supplied to the control unit 111. The control unit 111 controls the operation of the image compression encoder 114 based on the information regarding the encoding bit rate. In this case, the bit rate of the compressed-image data generated by the image compression encoder 114 is controlled so as to become the bit rate indicated by the information regarding the encoding bit rate transmitted from the monitoring apparatus 103.

Exemplary Configuration of Monitoring Apparatus

Figure 3:
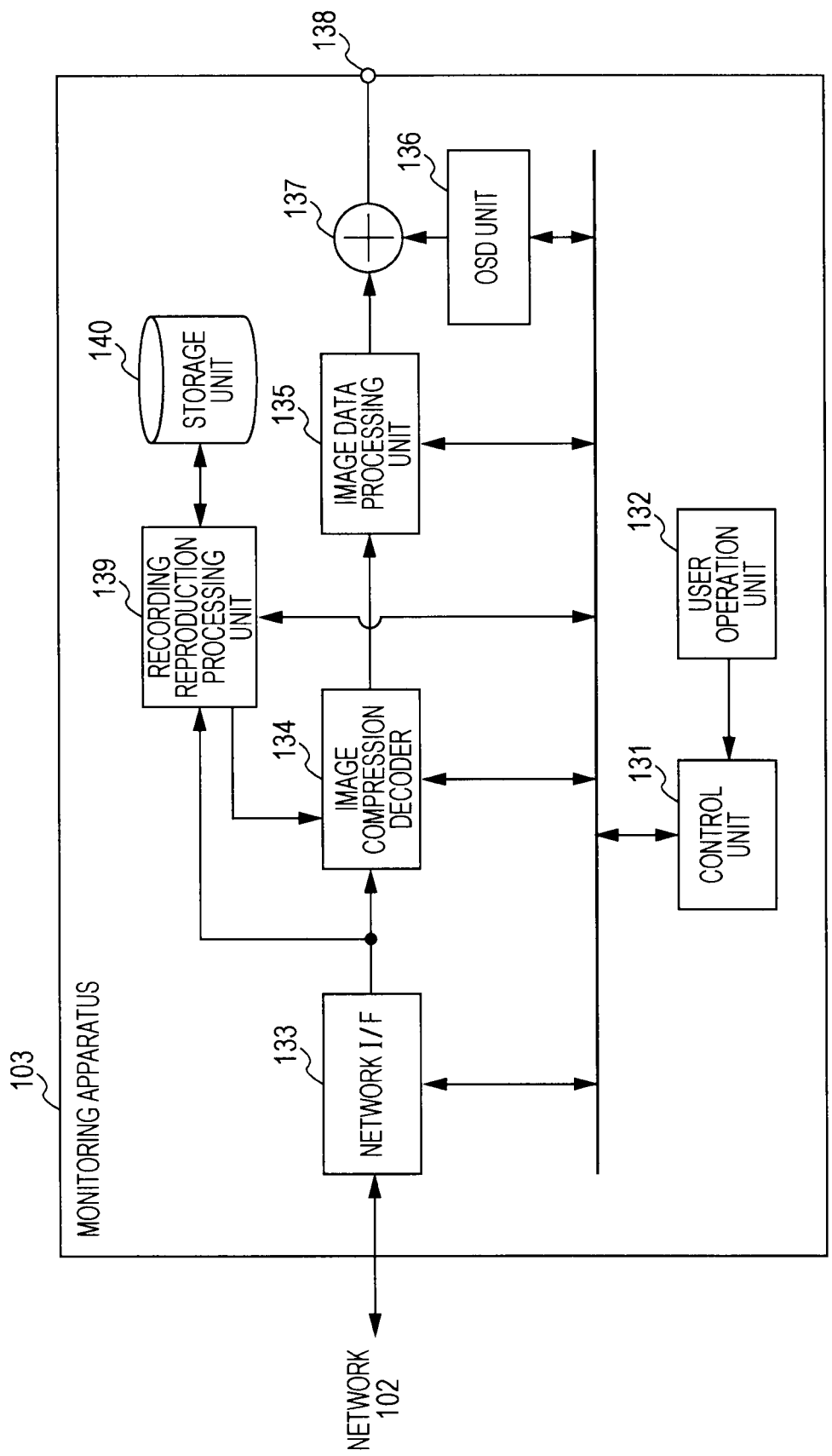
FIG. 3 is a block diagram illustrating an exemplary configuration of a monitoring apparatus (reception apparatus) forming the monitoring camera system.

FIG. 3 is a diagram illustrating an exemplary configuration of the monitoring apparatus 103. The monitoring apparatus 103 includes a control unit 131, a user operation unit 132, a network interface 133, an image compression decoder 134, and an image data processing unit 135. The monitoring apparatus 103 further includes an OSD (On-Screen Display) unit 136, a synthesis unit 137, an output terminal 138, a recording reproduction processing unit 139, and a storage unit 140.

The control unit 131 controls an operation of each unit of the monitoring apparatus 103. For example, the control unit 131 includes a CPU, a ROM, and a RAM. The CPU controls the operation of each unit by reading a control program stored in the ROM, as necessary, transmitting and developing the read control program to and on the RAM, and reading and executing the developed control program. The user operation unit 132 is connected to the control unit 131. The user operation unit 132 is configured by a user interface such as a keyboard and a mouse. The user interface unit 132 generates an operation signal formed in response to an operation of a user and supplies the operation signal to the control unit 131.

The network interface 133 receives the compressed-image data transmitted from the monitoring cameras 101-1 to 101-6 via the network 102 (see FIG. 1). The network interface 133 transmits the encoding bit rate of each monitoring camera determined by the control unit 131 to the corresponding monitoring cameras via the network 102, as described below.

The storage unit 140 records the compressed-image data received by the network interface 133. The storage unit 140 is configured by a hard disk drive (HDD) or the like. The recording reproduction processing unit 139 records the compressed-image data in the storage unit 140 and controls the reproduction of the compressed-image data from the storage unit 140.

The image compression decoder 134 obtains the received-image data from the monitoring cameras 101-1 to 101-6 by performing a data decompressing process on the compressed-image data received from the network interface 133 or the compressed-image data reproduced from the storage unit 140. The image compression decoder 134 normally performs the data decompressing process on the compressed-image data received from the network interface 133; however, during reproduction, the image compression decoder 134 performs the data decompressing process on the compressed-image data reproduced from the storage unit 140.

The image data processing unit 135 performs the scaling process or the like on the received-image data obtained by the image compression decoder 134 to generate display image data used for displaying the images of the monitoring cameras 101-1 to 101-6 on the corresponding display windows (display range) within the respective screens. The OSD unit 136 generates an OSD display signal under the control of the control unit 131. For example, the OSD unit 136 generates the display signal used for displaying a setting UI (User Interface) screen, when the correspondence relation (profile) between the size of a display window and an encoding bit rate is set.

The synthesis unit 137 synthesizes the display image data obtained from the image data processing unit 135 and the display signal output from the OSD unit 136 and outputs the synthesized signal to the output terminal 138. The display 104 (see FIG. 1) is connected to the output terminal 138.

The operation of the monitoring apparatus 103 shown in FIG. 3 will be described. The network interface 133 receives the compressed-image data transmitted from the monitoring cameras 101-1 to 101-6. The compressed-image data are supplied to the recording reproduction processing unit 139 and the image compression decoder 134. When an instruction to record the compressed-image data by setting of a user is given, the compressed-image data are recorded in the storage unit 140 by the recording reproduction processing unit 139.

The image compression decoder 134 performs the data decoding process on the compressed-image data supplied from the network interface 133 to obtain the received-image data. The received-image data transmitted from the monitoring cameras 101-1 to 101-6 and obtained the image compression decoder 134 are supplied to the image data processing unit 135. The image data processing unit 135 performs the scaling process or the like on the received-image data to generate display image data used for displaying the images of the monitoring cameras 101-1 to 101-6 on the corresponding display windows (display range) within the respective screens.

The display image data are output to the output terminal 138 via the synthesis unit 137. Thus, images corresponding to the monitoring images captured by the monitoring cameras 101-1 to 101-6 are displayed on the screen of the display 104 connected to the output terminal 138. In this case, the images of the respective monitoring cameras are displayed on the corresponding display windows within the screen.

When the compressed-image data from the storage unit 140 are reproduced, reproduction compressed-image data are supplied to the image compression decoder 134 via the recording reproduction processing unit 139. Hereinafter, like the process of processing the compressed-image data received by the above-described network interface 133, the images corresponding to the monitoring images captured by the monitoring cameras 101-1 to 101-6 are displayed on the screen of the display 104.

Figure 4A:
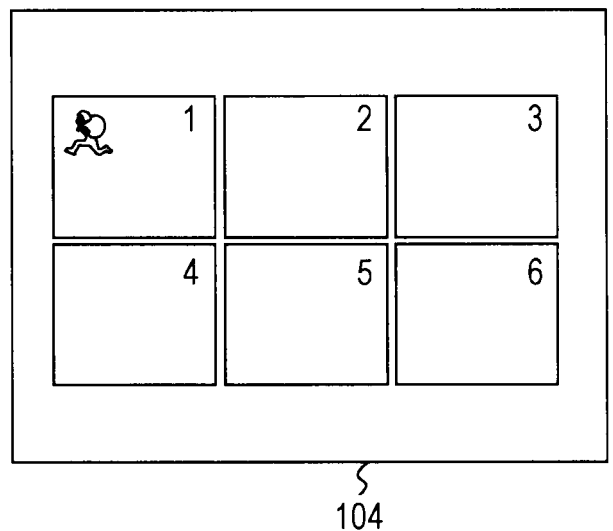
FIGS. 4A and 4B are diagrams illustrating screen display examples of a display which is connected to the monitoring apparatus and to which display image data is supplied.

FIG. 4A is a diagram illustrating an exemplary screen display of the display 104. On this exemplary screen display, display windows displaying "1" to "6" correspond to the images of the monitoring cameras 101-1 to 101-6, respectively. On this exemplary screen display, the images displayed on the display windows are omitted except for the display window "1".

Size Setting of Display Window

The user can set the size (change the size) of each display window in the monitoring apparatus 103. The size of the display window is set, for example, when the user drags the display window with a mouse or the user uses a slider or spin button displayed on a UI (User Interface) screen.

Figure 4B:
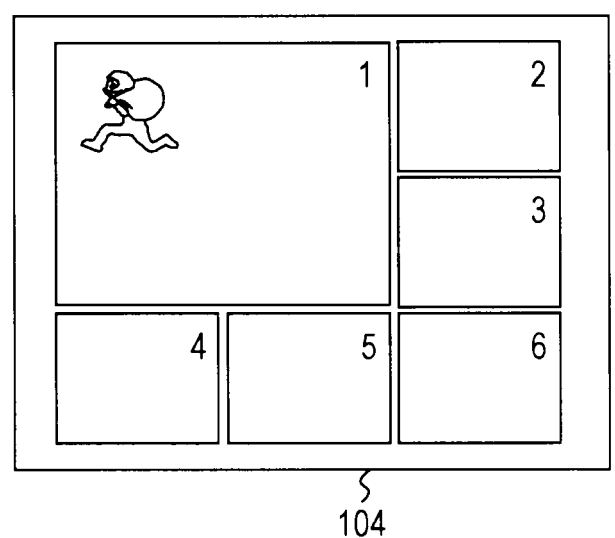

FIG. 4B is a diagram illustrating another exemplary screen display of the display 104. On the exemplary screen display of FIG. 4B, the display window "1" is enlarged compared to the exemplary screen display of FIG. 4A. When the size of the display window is expanded or reduced, the scaling process performed by the image data processing unit 135 is thus modified and the size of the image displayed on the display window is expanded or reduced.

The control unit 131 of the monitoring apparatus 103 determines the encoding bit rate of each of the monitoring cameras 101-1 to 101-6 depending on each of the sizes of the display windows "1" to "6". The information regarding the encoding bit rates of the monitoring cameras 101-1 to 101-6 is supplied from the control unit 131 to the network interface 133. The encoding bit rate of each monitoring camera is transmitted from the network interface 133 to the corresponding monitoring camera via the network 102.

The monitoring cameras 101-1 to 101-6 each control the generation of the compressed-image data based on the information regarding the encoding bit rate transmitted from the monitoring apparatus 103, as described above. That is, each monitoring camera controls the operation of the image compression encoder so that the bit rate of the compressed-image data becomes the bit rate indicated by the information regarding the encoding bit rate transmitted from the monitoring apparatus 103.

Correspondence Relation (Profile) between Window Size and Bit Rate

The control unit 131 of the monitoring apparatus 103 determines the encoding bit rate of each of the monitoring cameras 101-1 to 101-6 based on the correspondence relation between the size of the display window and the encoding bit rate, as described above. In the monitoring apparatus 103, the user can independently set the correspondence relations between the sizes of the display windows and the encoding bit rates for the monitoring cameras 101-1 to 101-6.

FIGS. 5A to 5D and FIGS. 6A to 6F are diagrams illustrating examples of the correspondence relation between the size of the display window and the encoding bit rate. Hereinafter, the correspondence relation is referred to as a "profile".

The profile of FIG. 5A is a profile in which the encoding bit rate is fixed regardless of the size of the display window. In the monitoring camera to which this profile is applied, the encoding bit rate of the camera is not changed even when the size of the display window is changed during the display of the image captured by this camera.

The profile of FIG. 5B is a profile in which the encoding bit rate is in direct proportion to the size of the display window. In the monitoring camera to which this profile is applied, the encoding bit rate can be changed in response to the change in the size of the display window during the display of the image captured by this camera.

The profile of FIG. 5C is a profile in which the encoding bit rate is not associated with the size of the display window and is set to a given lower limit value in a range in which the size of the display window is equal to or less than a predetermined value and the encoding bit rate is in direct proportion to the size of the display window in a range in which the size of the display window exceeds the predetermined value. In the monitoring camera to which this profile is applied, the encoding bit rate is not set to be equal to or less than a given value even when the size of the display window is changed during the display of the image captured by this camera.

The profile of FIG. 5D is a profile in which the encoding bit rate is not associated with the size of the display window and is set to a given upper limit value in a range in which the size of the display window is equal to or larger than a predetermined value and the encoding bit rate is in direct proportion to the size of the display window in a range in which the size of the display window is less than the predetermined value. In the monitoring camera to which this profile is applied, the encoding bit rate is not set to be equal to or larger than a given value even when the size of the display window is changed during the display of the image captured by this camera.

The profiles of FIGS. 6A to 6F are exemplary profiles which can be considered separated from the above-described profiles of FIGS. 5A to 5D. The profile of FIG. 6A is a profile in which the correspondence relation between the size of the display window and the encoding bit rate is expressed by a linear function and the encoding bit rate is set to a predetermined value even when the size of the display window is 0.

The profile of FIG. 6B is a profile in which the encoding bit rate is not associated with the size of the display window and is set to a given value in a middle range of the size of the display window and the encoding bit rate depends on the size of the display window in a range other than the middle range. The profile of FIG. 6C is a profile in which the correspondence relation between the display window and the encoding bit rate is expressed by a linear function and the encoding bit rate is set to 0 when the size of the display window is equal to or less than a predetermined value.

The profiles of FIGS. 6D and 6E are exemplary profiles in which the form of the graph is discontinuous. The profile of FIG. 6D is a profile in which the encoding bit rate is set to 0 when the size of the display window is 0, and the correspondence relation between the display window and the encoding bit rate is expressed by a linear function when the size of the display window exceeds 0. The profile of FIG. 6E is a profile in which the size of the display window is divided into three ranges, the encoding bit rate of each divided range is set to a given value and the form of the graph is a step-like form.

The profile of FIG. 6F is an exemplary profile in which the form of the graph is nonlinear. The profile of FIG. 6F is a profile in which the change in the encoding bit rate is increased as the size of the display window is increased.

When the correspondence relation (profile) between the size of the display window and the encoding bit rate is set, the OSD unit 136 generates a display signal used for displaying a setting UI screen under the control of the control unit 131. The synthesis unit 137 synthesizes the display signal with the display image data from the image data processing unit 135. Then, the setting UI screen is displayed on the display 104.

Thus, the user can simply set the profiles using the setting UI screen displayed on the display 104. FIGS. 7A to 7C are diagrams illustrating an example of the order in which a profile such as the profile of FIG. 5C is set. In FIG. 7A, an initial screen of the setting UI screen is shown.

Initially, the user drags the mouse or the like of the user operation unit 132 to draw a straight line L1 indicating a given lower limit of the encoding bit rate in a range in which the size of the display window is equal to or less than the predetermined value, as shown in FIG. 7B. Next, as shown in FIG. 7C, the user drags the mouse or the like to draw a straight line L2 indicating the direct proportion of the encoding bit rate to the size of the display window in the range in which the size of the display window exceeds the predetermined value. Then, the setting of the profile for a given monitoring camera ends.

The control unit 131 of the monitoring apparatus 103 determines the encoding bit rates of the monitoring cameras 101-1 to 101-6 based on the profiles (the correspondence relation between the size of the display window and the encoding bit rate), as described above. Hereinafter, the determination of the encoding bit rate of each monitoring camera by the control unit 131 of the monitoring apparatus 103 will be described in detail.

Function of Setting or Not Setting Bit Rate Value Priority Option

The monitoring apparatus 103 has a function of setting or not setting a bit rate value priority option for each monitoring camera as a function associated with the determination of the encoding bit rate. For example, the user operates the user operation unit 132 and selects setting of the bit rate value priority option from a setting menu to set or not to set the bit rate value priority option for each monitoring camera. The encoding bit rate of the monitoring camera in which the bit rate value priority option is set is determined to be a value calculated from the profile to receive the compressed-image data from the monitoring cameras 101-1 to 101-6, as long as the encoding bit rate does not exceed a sum bandwidth bit rate.

In this case, the display signal used for displaying the setting menu and the setting UI screen is generated from the OSD unit 136 under the control of the control unit 131. Then, the setting menu and the setting UI screen of the display 104 are displayed. Even when the sum bandwidth bit rate is changed, as described below, the setting menu and the setting UI screen of the display 104 are displayed in the same manner.

Function of Changing Sum Bandwidth Bit Rate

The monitoring apparatus 103 also has a function of changing the above-described sum bandwidth bit rate as a function associated with the determination of the encoding bit rate. For example, the user can operate the user operation unit 132 and select changing of the sum bandwidth bit rate from the setting menu to change the sum bandwidth bit rate.

The sum bandwidth bit rate is changed, for example, when a problem occurs in the currently used network line and the network line is thus switched to a backup line with a narrower bandwidth or vice versa. Alternatively, the sum bandwidth bit rate may be changed automatically in response to the switch of the line.

For example, the control unit 131 of the monitoring apparatus 103 determines the encoding bit rate for each monitoring camera and transmits the information regarding the encoding bit rate, when the size of the display window corresponding to at least one of the monitoring cameras 101-1 to 101-6 is changed. For example, the control unit 131 of the monitoring apparatus 103 determines the encoding bit rate for each monitoring camera and transmits the information regarding the encoding bit rate, when the sum bandwidth bit rate is changed.

Determining Encoding Bit Rate of Each Monitoring Camera

The control unit 131 of the monitoring apparatus 103 determines the encoding bit rate of each monitoring camera using not only the profile of each monitoring camera but also the setting of the bit rate value priority option of each monitoring camera, information regarding non-setting, and the value of the sum bandwidth bit rate.

Figure 8:
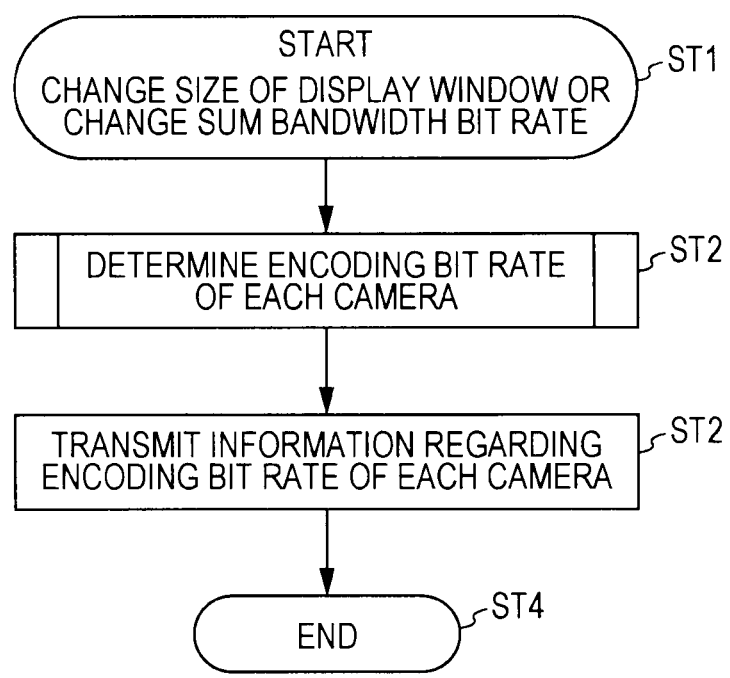
FIG. 8 is a flowchart illustrating an example of processing order in which the control unit of the monitoring apparatus determines the encoding bit rates of the monitoring cameras and transmits information regarding the encoding bit rates.

FIG. 8 is a flowchart illustrating an example of the order in which the control unit 131 determines the encoding bit rates of the monitoring cameras and transmits the information regarding the encoding bit rate. The control unit 131 starts the process in step ST1, and then process proceeds to step ST2. In step ST2, the control unit 131 determines the encoding bit rate of each camera (monitoring camera). In step ST3, the control unit 131 then transmits the information regarding the encoding bit rate determined in step ST2 to each camera. In step ST4, the control unit 131 then terminates the process.

Figure 9:
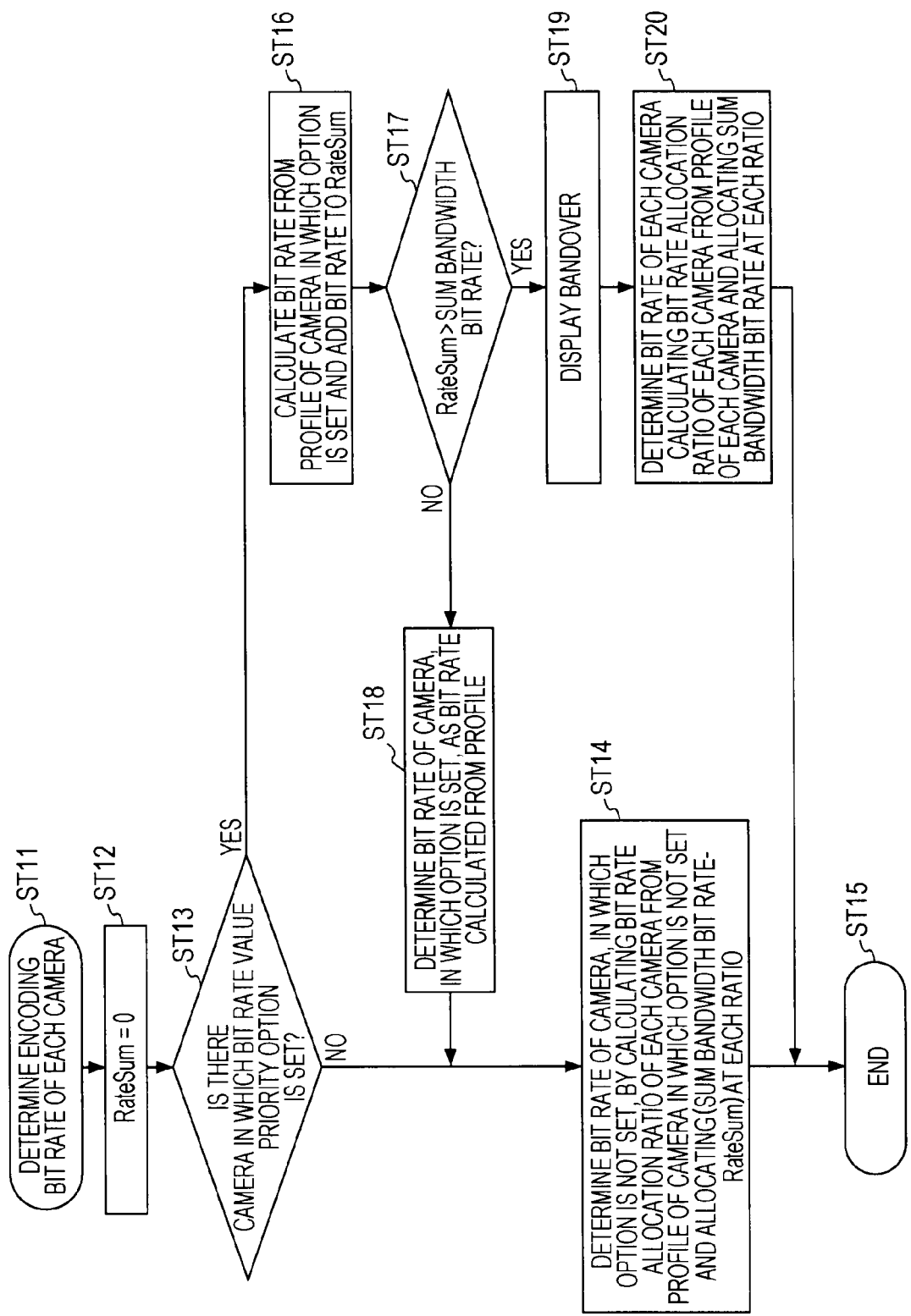
FIG. 9 is a flowchart illustrating an example of processing order in which the encoding bit rates of the cameras are determined.

FIG. 9 is a flowchart illustrating an example of the order of the process of determining the encoding bit rate of each camera in step ST2 of the flowchart in FIG. 8. The control unit 131 starts the process in step ST11, and then process proceeds to step ST12. In step ST12, the control unit 131 sets RateSum to 0. Here, RateSum is a variable of a bit rate sum.

In step ST13, the control unit 131 then determines whether there is a camera in which the bit rate value priority option is set. When there is no camera in which the bit rate value priority option is set, the control unit 131 allows the process to proceed to step ST14.

In step ST14, the control unit 131 calculates the encoding bit rate corresponding to the size of the display window of each camera from the profile of the camera in which the option is not set. In step ST14, the control unit 131 calculates a ratio of the encoding bit rates calculated from the profiles of the respective cameras and sets this ratio as a bit rate allocation ratio.

In step ST14, the control unit 131 also allocates (the sum bandwidth bit rate-RateSum) at the bit rate allocation ratio of the cameras and determines the encoding bit rate of each camera. In this case, since the control unit 131 allows the process from step ST13 to proceed to step ST14, RateSum is 0. After step ST14, the control unit 131 terminates the process in step ST15.

When there is a camera in which the bit rate value priority option is set in step ST13, the control unit 131 allows the process to proceed to step ST16. In step ST16, the control unit 131 calculates the encoding bit rate corresponding to the size of the display window of the camera from the profile of the camera in which the option is set. In step ST16, the control unit 131 also adds the encoding bit rate calculated from the profile of each camera to RateSum.

In step ST17, the control unit 131 then determines whether RateSum exceeds the sum bandwidth bit rate. When RateSum does not exceed the sum bandwidth bit rate, in step ST18, the control unit 131 determines the encoding bit rate of the camera in which the option is set, as the encoding bit rate calculated from the profile in step ST16. After step ST18, the control unit 131 allows the process to proceed to step ST14.

In step ST14, the control unit 131 calculates the encoding bit rate corresponding to the size of the display window of each camera from the profile of the camera in which the option is not set. In step ST14, the control unit 131 also calculates the ratio of the encoding bit rates calculated from the profiles of the respective cameras and sets this ratio of the encoding bit rates as the bit rate allocation ratio of the cameras.

In step ST14, the control unit 131 allocates (the sum bandwidth bit rate-RateSum) at the bit rate allocation ratio of the cameras and determines the encoding bit rate of each camera. After step ST14, the control unit 131 terminates the process in step ST15.

When RateSum exceeds the sum bandwidth bit rate in step ST17, the control unit 131 allows the process to proceed to step ST19. In step ST19, the control unit 131 displays bandover indicating that the sum value of the encoding bit rates of only the cameras in which the option is set exceeds the sum bandwidth bit rate, and instructs the user of the fact that the sum value thereof exceeds the sum bandwidth bit rate. In this case, the control unit 131 permits the OSD unit 136 to generate a display signal for displaying the bandover.

Thus, when the sum value of the encoding bit rates of only the cameras in which the option is set exceeds the sum bandwidth bit rate, the control unit 131 temporarily invalidates the setting of the cameras in which the option is set. That is, after step ST19, the control unit 131 allows the process to proceed to step ST20.

In step ST20, the control unit 131 calculates the encoding bit rate corresponding to the size of the display window of each camera from the profile of the camera in which the option is not set. In step ST20, the control unit 131 also calculates the ratio of the encoding bit rates calculated from the profiles of the cameras (the cameras in which the option is set and the cameras in which the option is not set), and sets this ratio of the encoding bit rates as the bit rate allocation ratio of the cameras.

In step ST20, the control unit 131 allocates the sum bandwidth bit rate of each camera at the bit rate allocation ratio of the cameras, and determines the encoding bit rate of each camera. After step ST20, the control unit 131 terminates the process in step ST15.

A specific example of the determination of the encoding bit rate of each camera will be described. In order to facilitate a simple description, a case where three cameras (Camera 1, Camera 2, and Camera 3) are provided will be described.

First, a case where the option is not set in any of Camera 1, Camera 2, and Camera 3 will be described. FIG. 10A is a diagram illustrating a case in which the ratio among the sizes (areas) of the display windows of Camera 1, Camera 2, and Camera 3 is set to 1:1:1. Here, on the assumption that x is the size of the display window and y is the encoding bit rate, the profile of Camera 1 is expressed by linear function y=5k*x (where k is a constant). Likewise, the profile of Camera 2 is expressed by linear function y=2k*x and the profile of Camera 3 is expressed by linear function y=3k*x.

When the ratio among the sizes of the display windows of Camera 1, Camera 2, and Camera 3 is set to 1:1:1, the encoding bit rate ratio among the cameras calculated from the profiles is 5:2:3. In this case, the bit rate allocation ratio among Camera 1, Camera 2, and Camera 3 is calculated at 50%:20%:30%. Therefore, the ratio among the encoding bit rates of Camera 1, Camera 2, and Camera 3 is calculated at 50%:20%:30% of the entire bandwidth (sum bandwidth bit rate).

FIG. 10B is a diagram illustrating a case in which the size of the display window of Camera 1 is enlarged and thus the ratio among the sizes (areas) of the display windows of Camera 1, Camera 2, and Camera 3 is set to 4:1:1. In this case, the encoding bit rate ratio among the cameras calculated from the profiles is 20:2:3. Thus, the bit rate allocation ratio among Camera 1, Camera 2, and Camera 3 is calculated as 80%:8%:12%. Therefore, the ratio among the encoding bit rates of Camera 1, Camera 2, and Camera 3 is respectively calculated at 80%:8%:12% of the entire bandwidth (sum bandwidth bit rate).

Next, a case where the option is not set in Camera 1 and Camera 2 and the option is set in Camera 3 will be described. FIG. 11A is a diagram illustrating a case in which the ratio among the sizes (areas) of the display windows of Camera 1, Camera 2, and Camera 3 is set to 1:1:1. Here, on the assumption that x is the size of the display window and y is the encoding bit rate, the profile of Camera 1 is expressed by linear function $y=5k*x$ (where k is a constant). Likewise, the profile of Camera 2 is expressed by linear function $y=2k*x$ and the profile of Camera 3 is expressed by linear function $y=3k*x$.

In Camera 3 in which the option is set, the encoding bit rate calculated from the profile depending on the size of the display window is set not to exceed the entire bandwidth (sum bandwidth bit rate).

In this case, the encoding bit rate of Camera 3 is determined as the encoding bit rate calculated from the profile. The encoding bit rates of Camera 1 and Camera 2 are determined as follows.

That is, the ratio the encoding bit rate of Camera 1 to the encoding bit rate of Camera 2 calculated from the profiles is 5:2. In this case, the bit rate allocation ratio of Camera 1 to Camera 2 is 71%:29%. Therefore, the ratio of the encoding bit rate of Camera 1 to the encoding bit rate of Camera 2 is calculated at 71%:29% of the remaining bandwidth obtained by subtracting the encoding bit rate of Camera 3 from the entire bandwidth (sum bandwidth bit rate).

FIG. 11B is a diagram illustrating a case in which the size of the display window of Camera 1 is enlarged and thus the ratio among the sizes (areas) of the display windows of Camera 1, Camera 2, and Camera 3 is set to 4:1:1. In this case, the encoding bit rate of Camera 3 is determined as the encoding bit rate calculated from the profile. The encoding bit rates of Camera 1 and Camera 2 are determined as follows.

That is, the ratio of the encoding bit rate of Camera 1 to the encoding bit rate of Camera 2 calculated from the profiles is 20:2. In this case, the bit rate allocation ratio of Camera 1 to Camera 2 is calculated at 91%:9%. Therefore, the ratio of the encoding bit rate of Camera 1 to the encoding bit rate of Camera 2 is calculated at 91%:9% of the remaining bandwidth obtained by subtracting the encoding bit rate of Camera 3 from the entire bandwidth (sum bandwidth bit rate).

In the monitoring apparatus 103 of the monitoring camera system 100 in FIG. 1, as described above, the control unit 131 determines the encoding bit rate of each monitoring camera based on the correspondence relation (profile) between the size of the display window and the encoding bit rate. The monitoring apparatus 103 is configured such that the user can operate the user operation unit 132 to set the correspondence relation (profile) between the size of the display window and the encoding bit rate for each of the monitoring cameras. Therefore, the encoding bit rate of each monitoring camera can be satisfactorily set as the value corresponding to an importance, a role (goal), or the like.

The user can operate the user operation unit 132 of the monitoring apparatus 103 of the monitoring camera system 100 in FIG. 1 so that the bit rate value priority option is set or not set for each monitoring camera. When the sum value of the bit rates calculated from the profile of the cameras in which the option is set does not exceed the sum bandwidth bit rate, the control unit 131 determines the encoding bit rate for the camera, in which the option is set, as the bit rate calculated from the profile. In this case, the control unit 131 determines the encoding bit rates of the cameras, in which the option is not set, by allocating the remaining bit rate at the ratio of the encoding bit rates calculated from the profile.

Thus, the sum value of the encoding bit rates of the monitoring cameras does not exceed the sum bandwidth bit rate. For example, a frame of an image can be prevented from being omitted. The encoding bit rate of the camera in which the option is set is not affected by the change in the sizes of the display windows of other monitoring cameras. The individually set profile is reflected in the encoding bit rates of the cameras in which the option is not set. Therefore, the encoding bit rate of each monitoring camera can be satisfactorily set as the value corresponding to an importance, a role (goal), or the like.

The control unit 131 of the monitoring apparatus 103 of the monitoring camera system 100 in FIG. 1 temporarily invalidates the option setting, when the sum value of the encoding bit rates calculated from the profile of the cameras in which the option is set exceeds the sum bandwidth bit rate. The control unit 131 determines the encoding bit rates of the monitoring cameras (the cameras in which the option is set and the cameras in which the option is not set) by allocating the sum bandwidth bit rate at the ratio of the encoding bit rates calculated from the profile.

Thus, the sum value of the encoding bit rates of the monitoring cameras does not exceed the sum bandwidth bit rate. For example, a frame of an image can be prevented from being omitted. The individually set profile is reflected in the encoding bit rates of the cameras. Therefore, the encoding bit rate of each monitoring camera can be satisfactorily set as the value corresponding to an importance, a role (goal), or the like.

The control unit 131 of the monitoring apparatus 103 of the monitoring camera system 100 in FIG. 1 determines the encoding bit rate of each monitoring camera and transmits the information regarding the encoding bit rate, when at least one of the sizes of the display windows for the monitoring cameras 101-1 to 101-6 is changed. Therefore, when the size of the display window corresponding to at least one of the monitoring cameras 101-1 to 101-6 is changed, the encoding bit rates of the respective monitoring camera can be changed immediately to an optimum value in response to the change in the size of the display window, thereby reducing the burden of the operation on the user.

The monitoring apparatus 103 of the monitoring camera system 100 in FIG. 1 is configured such that the sum bandwidth bit rate can be changed. The control unit 131 of the monitoring apparatus 103 determines the encoding bit rate of each monitoring camera and transmits the information regarding the encoding bit rate, when the sum bandwidth bit rate is changed automatically or by the operation of the user.

Thus, when the sum bandwidth bit rate is changed, the encoding bit rate of each monitoring camera can be changed immediately to an optimum value in response to the change in the sum bandwidth bit rate. For example, when a problem occurs in the currently used network line and thus the network line is changed to a backup line with a narrower bandwidth, the sum value of the encoding bit rates of the monitoring cameras does not exceed the sum bandwidth bit rate. Therefore, a frame of an image can be prevented from being omitted.

Moreover, the sum bandwidth bit rate can be changed. Therefore, when compressed/encoded data from each monitoring camera is stored in the storage unit 140, a recording bit rate can be changed with ease. Accordingly, the remaining recording time in the storage unit 140 can be lengthened (adjusted) with ease.

2. Modified Example

The monitoring apparatus 103 of the monitoring camera system 100 in FIG. 1 has the function of setting whether the bit rate value priority option is set or not set for each monitoring camera. However, the monitoring apparatus 103 which does not have this function may be taken into consideration. In this case, the control unit 131 determines the encoding bit rate of each camera as in the following first or second example below.

First Example

The control unit 131 calculates the encoding bit rates corresponding to the sizes of the display windows of the respective cameras from the profile of the respective cameras. Then, the control unit 131 calculates the ratio of the encoding bit rates calculated from the profile of the respective cameras and sets this ratio of the encoding bit rates as the bit rate allocation ratio of the respective cameras. Then, the control unit 131 allocates the sum bandwidth bit rate at the bit rate allocation ratio of the respective cameras and determines the encoding bit rates of the respective cameras.

Second Example

The control unit 131 calculates the encoding bit rates corresponding to the sizes of the display windows of the respective cameras from the profile of the respective cameras. The control unit 131 determines the encoding bit rate calculated from the profile of each camera as the encoding bit rate of each camera without change. In the second example, the sum value of the encoding bit rates of the respective monitoring cameras may exceed the sum bandwidth bit rate, but it is effective when the sum bandwidth bit rate is sufficiently large.

Figure 12A:
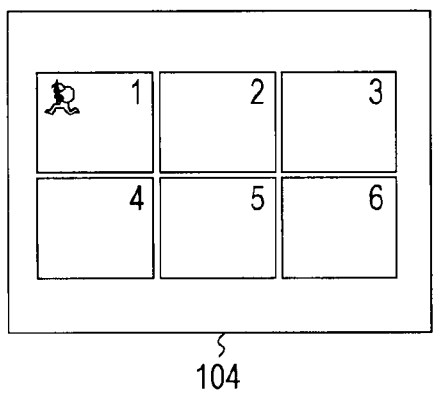
FIGS. 12A to 12C are diagrams illustrating a display format (tile-like display and overlapping display) in an example in which the sizes of the display windows of the monitoring cameras are changed.
Figure 12B:
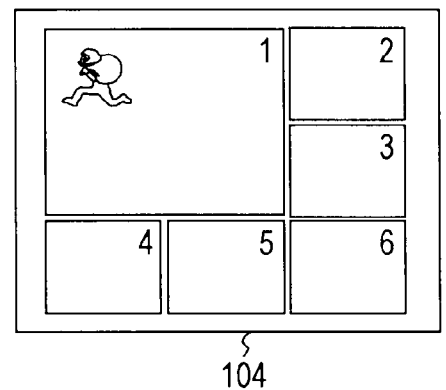
Figure 12C:
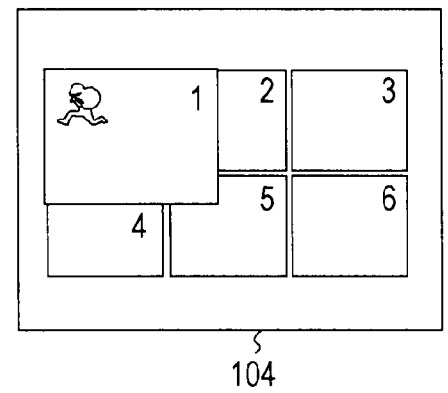

In the monitoring apparatus 103 of the monitoring camera system 100 in FIG. 1, examples (see FIGS. 4A and 4B) in which a tile-like display is implemented so that the display windows do not overlap with each other are shown as examples in which the sizes of the display windows are changed, as shown in FIGS. 12A and 12B. However, the embodiment of the invention is likewise applicable even to overlapping display in which the display windows partially overlap with each other as the sizes of the display windows are changed, as shown in FIGS. 12A and 12C.

The size of the display window of each monitoring camera can be set according to the following method in the monitoring apparatus 103 of the monitoring camera system 100 in FIG. 1. That is, for example, the user may drag the display window with a mouse, or the user may use a slider or a spin button displayed on the UI (User Interface) screen in order to set the size of the display window. As well as other methods, in order to set the size of the display window of each monitoring camera, for example, the boundary line of bar graphs indicating the sizes of the display windows of the monitoring cameras may be moved, or a numerical value indicating the sizes of the display windows may be input.

Figure 13:
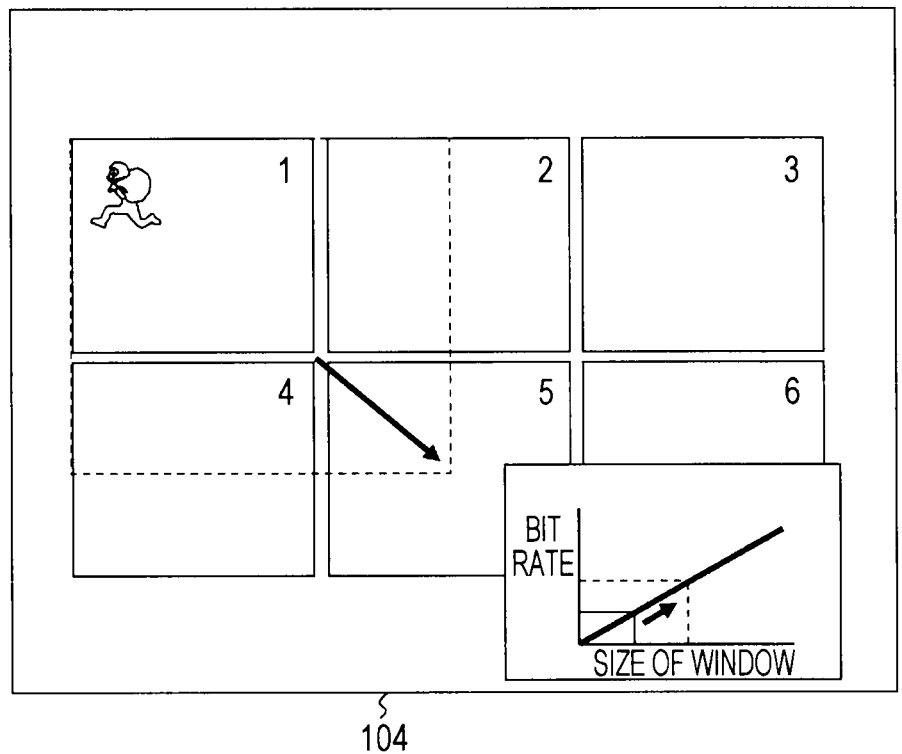
FIG. 13 is a diagram illustrating display of a corresponding profile when the sizes of the display windows of the monitoring cameras are set.

When the size of the display window of each monitoring camera is set in the monitoring apparatus 103 of the monitoring camera system 100 in FIG. 1, a graph of the corresponding profile may be displayed, as shown in FIG. 13. In this case, when the size of the current display window and the encoding bit rate are displayed in a combined manner, the user can recognize the encoding bit rate corresponding to the size of the current display window. Alternatively, the graph of the profile may not be displayed, but the encoding bit rate corresponding to the size of the current display window may be displayed with a numerical value or a bar graph.

In the example of the monitoring camera system 100 in FIG. 1, external apparatuses are the monitoring cameras 101-1 to 101-6 and the compressed-image data are transmitted as compressed/encoded data from the monitoring cameras to the monitoring apparatus 103. The embodiment of the invention is likewise applicable to an apparatus, which is an external apparatus other than a monitoring camera and is capable of transmitting the compressed/encoded data, such as a VOD (Video On Demand) server or a terminal of a TV conference apparatus. The compressed/encoded data is not limited to the compressed-image data. The compressed/encoded data may include not only the compressed-image data or compressed-document data used for display information but also compressed-voice data.

In the monitoring camera system 100 in FIG. 1, the network 102 is a wired network. However, the network 102 is not limited to a wired network, but may be a wireless network. In the monitoring camera system 100 in FIG. 1, the monitoring apparatus 103 and the display 104 are independent apparatuses, but may be integrally formed.

The present application contains subject matter related to that disclosed in Japanese Priority Patent Application JP 2009-296763 filed in the Japan Patent Office on Dec. 28, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reception apparatus comprising:
    circuitry configured to
        receive compressed/encoded data from a predetermined number of external apparatuses connected via a network,
        decode the received compressed/encoded data to obtain received data,
        perform data processing so that information based on the received data, which have been transmitted from the predetermined number of external apparatuses, is displayed on corresponding display windows on a screen, respectively,
        set sizes of the display windows respectively corresponding to the predetermined number of external apparatuses,
        set a bit rate value priority option to at least one of the predetermined number of external apparatuses,
        determine an encoding bit rate of each external apparatus corresponding to the set size of the display window based on a correspondence relation between the set size of the display window and the encoding bit rate and based on whether the bit rate value priority option is set for the at least one of the predetermined number of external apparatuses,
transmit information regarding each of the determined encoding bit rates to each of the corresponding external apparatuses, and
set the correspondence relation between the set size of the display window and the encoding bit rate for each of the predetermined number of external apparatuses.

2. The reception apparatus according to claim 1, wherein the circuitry is further configured to
calculate the encoding bit rate of each external apparatus corresponding to the set size of the display window based on the correspondence relation between the set size of the display window and the encoding bit rate,
calculate a bit rate allocation ratio of the respective external apparatuses based on the calculated encoding bit rates of the external apparatuses, and
determine the encoding bit rates of the external apparatuses by allocating a sum bandwidth bit rate, which is used to receive the compressed/encoded data from the predetermined number of external apparatuses, at the calculated bit rate allocation ratio of the respective calculated external apparatuses.

3. The reception apparatus according to claim 1, wherein the circuitry is further configured to
calculate the encoding bit rate of each external apparatus corresponding to the set size of the display window based on the correspondence relation between the set size of the display window and the encoding bit rate,
determine the calculated encoding bit rates of the external apparatuses as the encoding bit rates of the external apparatuses in which the bit rate value priority option is set, when a sum value of the calculated encoding bit rates of the external apparatuses in which the bit rate value priority option is set does not exceed a sum bandwidth bit rate which is used to receive the compressed/encoded data from the predetermined number of external apparatuses,
calculate a bit rate allocation ratio of the respective external apparatuses other than the external apparatuses in which the bit rate value priority option is set among the predetermined number of external apparatuses based on the encoding bit rates of the external apparatuses, and
determine the encoding bit rates of the external apparatuses by allocating, at the calculated bit ratio allocation ratio of the respective external apparatuses, a remaining bit rate obtained by subtracting a sum value of the calculated encoding bit rates of the external apparatuses, in which the bit rate value priority option is set, from the sum bandwidth bit rate.

4. The reception apparatus according to claim 3, wherein the circuitry is configured to
calculate a bit rate allocation ratio of all the predetermined number external apparatuses based on the calculated encoding bit rate of each external apparatus, when the sum value of the calculated encoding bit rates of the external apparatuses in which the bit rate value priority option is set exceeds the sum bandwidth bit rate, and
determine the encoding bit rate of each external apparatus by allocating the sum bandwidth bit rate at the calculated bit rate allocation ratio of the respective calculated external apparatuses.

5. The reception apparatus according to claim 1, wherein the circuitry is further configured to
calculate the encoding bit rate of each external apparatus corresponding to the set size of the display window based on the correspondence relation between the set size of the display window and the encoding bit rate, and
determine the calculated encoding bit rate of each external apparatus as the encoding bit rate of each external apparatus.

6. The reception apparatus according to any one of claims 2 to 5, wherein the circuitry is configured to determine the encoding bit rate of each external apparatus, when the circuitry changes the set size of the display window corresponding to at least one of the external apparatuses.

7. The reception apparatus according to any one of claims 2 to 4, wherein the circuitry is further configured to
change the sum bandwidth bit rate, and
determine the encoding bit rate of each external apparatus, when the circuitry changes the sum bandwidth bit rate.

8. The reception apparatus according to claim 1, wherein the circuitry is configured to suggest a setting user interface screen.

9. A reception method comprising the steps of:
receiving compressed/encoded data from a predetermined number of external apparatuses connected via a network;
decoding the compressed/encoded data received in the step of receiving the compressed/encoded image to obtain received data;
performing data processing so that information based on the received data, which have been transmitted from the predetermined number of external apparatuses, obtained in the decoding step is displayed on corresponding display windows on a screen, respectively;
setting sizes of the display windows respectively corresponding to the predetermined number of external apparatuses;
setting, by circuitry of a reception apparatus, a bit rate value priority option to at least one of the predetermined number of external apparatuses;
determining, by the circuitry of the reception apparatus, an encoding bit rate of each external apparatus corresponding to the size of the display window set in the step of setting the sizes of the display windows based on a correspondence relation between the size of the display window and the encoding bit rate and based on whether the bit rate value priority option is set for the at least one of the predetermined number of external apparatuses;
transmitting information regarding each encoding bit rate determined in the step of determining the encoding bit rate to each of the corresponding external apparatuses; and
setting the correspondence relation between the size of the display window and the encoding bit rate for each of the predetermined number of external apparatuses.

10. The reception method according to claim 9, wherein the step of determining comprises:
calculating the encoding bit rate of each external apparatus corresponding to the size of the display window set in the step of setting the sizes of the display windows based on the correspondence relation between the size of the display window and the encoding bit rate,
determining the calculated encoding bit rates of the external apparatuses as the encoding bit rates of the external apparatuses in which the bit rate value priority option is set, when a sum value of the calculated encoding bit rates of the external apparatuses in which the bit rate value priority option is set does not exceed a sum bandwidth bit rate which is used to receive the compressed/encoded data from the predetermined number of external apparatuses, calculating a bit rate allocation ratio of the respective external apparatuses other than the external apparatuses in which the bit rate value priority option is set among the predetermined number of external apparatuses based on the encoding bit rates of the external apparatuses, and determining the encoding bit rates of the external apparatuses by allocating, at the calculated bit ratio allocation ratio of the respective external apparatuses, a remaining bit rate obtained by subtracting a sum value of the calculated encoding bit rates of the external apparatuses, in which the bit rate value priority option is set, from the sum bandwidth bit rate.

11. A non-transitory computer-readable storage medium storing a program which when executed by a computer, which is configured as a reception apparatus including circuitry configured to receive compressed/encoded data from a predetermined number of external apparatuses connected via a network, decode the received compressed/encoded data to obtain received data, perform data processing so that information based on the received data, which have been transmitted from the predetermined number of external apparatuses, obtained is displayed on corresponding display windows on a screen, respectively, and transmit information regarding each encoding bit rate to the predetermined number of external apparatuses, causes the computer to set sizes of the display windows respectively corresponding to the predetermined number of external apparatuses;

determine an encoding bit rate of each external apparatus corresponding to the set size of the display window based on a correspondence relation between the set size of the display window and the encoding bit rate; and set the correspondence relation between the set size of the display window and the encoding bit rate for each of the predetermined number of external apparatuses.

12. The non-transitory computer-readable storage medium according to claim 11, wherein execution of the program further causes the computer to calculate the encoding bit rate of each external apparatus corresponding to the set size of the display window based on the correspondence relation between the set size of the display window and the encoding bit rate, determine the calculated encoding bit rates of the external apparatuses as the encoding bit rates of the external apparatuses in which the bit rate value priority option is set, when a sum value of the calculated encoding bit rates of the external apparatuses in which the bit rate value priority option is set does not exceed a sum bandwidth bit rate which is used to receive the compressed/encoded data from the predetermined number of external apparatuses, calculate a bit rate allocation ratio of the respective external apparatuses other than the external apparatuses in which the bit rate value priority option is set among the predetermined number of external apparatuses based on the encoding bit rates of the external apparatuses, and determine the encoding bit rates of the external apparatuses by allocating, at the calculated bit ratio allocation ratio of the respective external apparatuses, a remaining bit rate obtained by subtracting a sum value of the calculated encoding bit rates of the external apparatuses, in which the bit rate value priority option is set, from the sum bandwidth bit rate.

* * * * *